United States Patent
Chapman, Jr. et al.

(10) Patent No.: US 7,455,240 B2
(45) Date of Patent: Nov. 25, 2008

(54) THERMOSTAT DISPLAY SYSTEM PROVIDING ANIMATED ICONS

(75) Inventors: John Gilman Chapman, Jr., Delaware, OH (US); Robert Burt, Columbus, OH (US); Tony Gray, Dublin, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 525 days.

(21) Appl. No.: 11/216,426

(22) Filed: Aug. 31, 2005

(65) Prior Publication Data

US 2007/0045433 A1    Mar. 1, 2007

(51) Int. Cl.
  *B64D 13/00* (2006.01)
  *F24D 19/10* (2006.01)
  *G05B 15/00* (2006.01)
(52) U.S. Cl. .................. 236/91 D; 236/91 R; 700/83
(58) Field of Classification Search ............... 236/46 R, 236/46 C, 91 D, 91 R; 700/275, 276, 83; 345/173
  See application file for complete search history.

(56) References Cited

U.S. PATENT DOCUMENTS

| | | | |
|---|---|---|---|
| 3,930,611 A | 1/1976 | Demaray | |
| 4,282,591 A | 8/1981 | Andreuccetti | |
| 4,288,990 A | 9/1981 | Schulz | |
| 4,462,540 A | 7/1984 | Dytch | |
| 4,969,508 A | 11/1990 | Tate et al. | |
| 5,082,173 A | 1/1992 | Poehlman et al. | |
| 5,189,412 A * | 2/1993 | Mehta et al. | 340/825.22 |
| 5,271,558 A | 12/1993 | Hampton | |
| 5,272,477 A | 12/1993 | Tashima et al. | |
| 5,595,342 A | 1/1997 | McNair et al. | |
| 5,803,357 A | 9/1998 | Lakin | |
| 5,833,134 A | 11/1998 | Ho et al. | |
| 5,924,486 A | 7/1999 | Ehlers et al. | |
| 6,116,512 A | 9/2000 | Dushane et al. | |
| 6,213,404 B1 | 4/2001 | Dushane et al. | |
| 6,449,533 B1 | 9/2002 | Mueller et al. | |
| 6,513,723 B1 | 2/2003 | Mueller et al. | |
| 2001/0048030 A1 | 12/2001 | Sharood et al. | |

(Continued)

FOREIGN PATENT DOCUMENTS

WO    WO 02/05052 A1    1/2002

OTHER PUBLICATIONS

Theta Engineering, "Smart" Thermostat, website, date last visited Oct. 26, 2006, previously visited Oct. 27, 2005, 3 pages, http://www.thetaeng.com/SmartThermostat.htm.

*Primary Examiner*—Chen-Wen Jiang
(74) *Attorney, Agent, or Firm*—Reinhart Boerner Van Deuren P.C.

(57) ABSTRACT

A visual display system and method for a digital thermostat having a user display screen to provide operational status information of the heating and/or cooling equipment controlled by the thermostat is provided. This visual display system utilizes animated icons to show operational status of the heating and/or cooling equipment. Static icons may also be used in one embodiment to indicate the current mode of the thermostat. Animated icons for the heating system, the cooling system, and fan operation are provided. The illusion of animation is provided by overwriting or replacing a displayed image with another image at a predetermined frequency. This predetermined frequency may be changed programmatically, and varied to provide different visual effects.

20 Claims, 2 Drawing Sheets

U.S. PATENT DOCUMENTS

2004/0133314 A1* 7/2004 Ehlers et al. ................ 700/276
2004/0260427 A1* 12/2004 Wimsatt .................... 700/275
2005/0043907 A1 2/2005 Eckel et al.
2005/0194457 A1 9/2005 Dolan

* cited by examiner

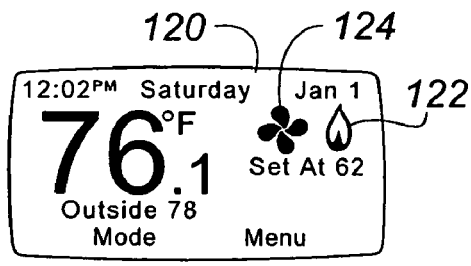
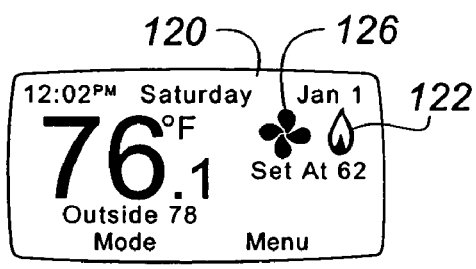
FIG. 2　　　　　　　　FIG. 3
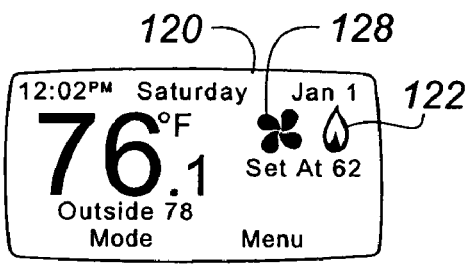
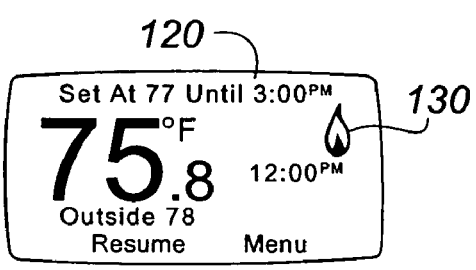
FIG. 4　　　　　　　　FIG. 5
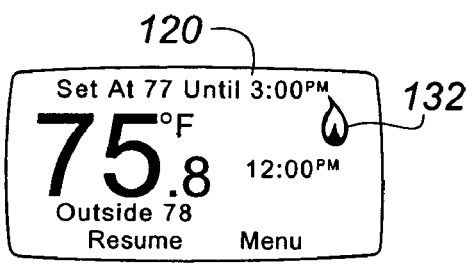
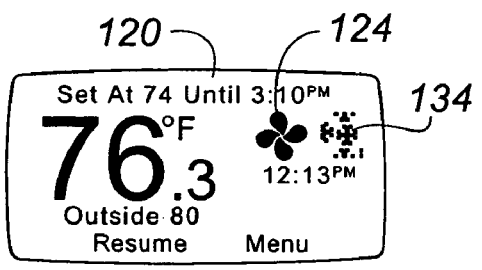
FIG. 6　　　　　　　　FIG. 7
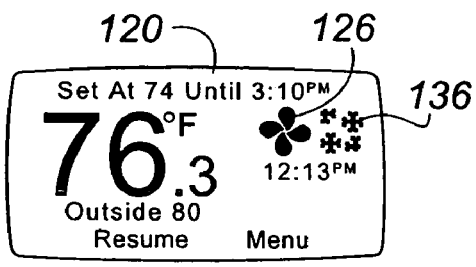
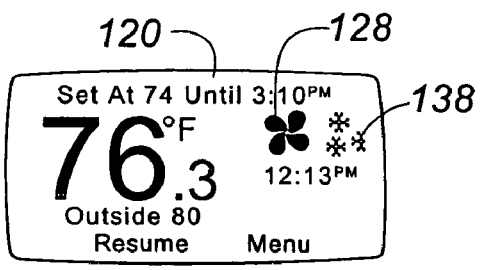
FIG. 8　　　　　　　　FIG. 9

THERMOSTAT DISPLAY SYSTEM PROVIDING ANIMATED ICONS

FIELD OF THE INVENTION

The present invention relates generally to digital thermostats, and more particularly to a display system for a digital thermostat to convey system operating information to a user.

BACKGROUND OF THE INVENTION

Occupants of dwellings and commercial structures have long benefited from the inclusion of a heating, ventilating, and air conditioning (HVAC) system that regulates the temperature and humidity within the dwelling or structure. Traditionally, the thermostat that controlled this temperature regulating equipment was a fairly simple electromechanical device that was simply wired to a heating device and/or to a cooling device. Once installed, the user need only move a selector switch between heating and cooling to designate which equipment was desired to be operated, move a selector switch between run and auto for a fan control, and rotate a dial to a desired set point temperature. No other user interface to the thermostat was needed or available, and no indication of system operation was provided.

Advances in control electronics have allowed the development of new, digital thermostats that may be programmed by a user to control the heating and cooling equipment in a much more energy efficient manner than the older electromechanical devices. These modern digital thermostats allow programming that can automatically set back the heat, for example, during periods when the dwelling or structure is not occupied, and can turn up the heat just prior to and during periods of occupation of the dwelling or structure. Indeed, many such digital thermostats allow for different programming options during different days of the week. For example, such a digital thermostat may provide for one programmed operation during the week and a different programmed operation on the weekend, to accommodate the different usage patterns of the occupants of that particular dwelling or structure.

While the advances that are being included in modern digital thermostats greatly enhance the users' comfort level and minimize the energy usage, the overall user experience interfacing with such a digital thermostat has not kept pace. Specifically, while such digital thermostats typically provide some form of user interface screen from which information is conveyed to the consumer, and from which the consumer may program the operation of the thermostat, such displays do not provide any indication that the heating or cooling equipment in the home is active.

To provide such indication of the operational status of the heating and/or cooling equipment, such digital thermostats now often include light emitting diode (LED) type indicators that illuminate when the heating and/or cooling equipment in the home is active. This provides an immediate visual indication of the operational status of the heating and/or cooling equipment. However, such LED indicators have led to several consumer complaints, and in some cases, reduction in performance of the thermostat itself.

Because an LED indicator needs to be bright enough to be visible during the daylight hours or within a lighted room to be effective, the amount of light output can be quite high. Unfortunately, many consumers have complained that such an LED indication is annoying, distracting, and unwanted in several situations. One such situation is when the thermostat is installed in, for example, a home theater where such a bright LED indicator detracts from the home theater experience. Another is when the thermostat is installed in a bedroom or other area where such a bright LED indicator would prove to be annoying.

In each of these types of situations, it has been known that consumers have used black electrical tape or other opaque tape to cover the LED indicators. While this solution removes the annoyance and distraction caused by the LED indicators, the consumer is left with no indication of the operational status of the heating and/or cooling equipment. The user is then forced to repeatedly removing the tape to determine the operational status, and replacing the tape when such LED indication would prove annoying or distracting.

In other thermostats, for example, battery powered thermostats or remote home control units, the inclusion of LED indicators reduces the useful battery life and therefore operational readiness of the thermostat itself. As such, manufacturers typically do not include LED indicators on such battery powered devices. However, since users often desire an indication of the operational status of the heating and/or cooling equipment, users of such thermostats have been known to modify the internal electronics to connect an indicator to the hardware of the thermostat. Because of the extra power demand from these added indicators, however, this typically results in the batteries of the thermostat having a shorter life.

To provide such an indication of the operational status of the heating and/or cooling equipment without modifying the electronics of the thermostat or remote controller itself, some users have been known to add indicators to the control lines of the heating and/or cooling equipment themselves. In this way, the indicator is illuminated when the thermostat commands the heating and/or cooling equipment to turn on. When such an indicator illuminates, the user knows that the thermostat has commanded the particular equipment to operate. However, hardwiring an indicator directly to the control line of the thermostat may cause spurious operation of the heating and/or cooling system due to the added component in the control line.

There exists, therefore, a need in the art for a display system for a digital thermostat that provides a visual indication of the operational status of the heating and/or cooling equipment, without being annoying and/or distracting to the user.

The invention provides such a digital thermostat display system. These and other advantages of the invention, as well as additional inventive features, will be apparent from the description of the invention provided herein.

BRIEF SUMMARY OF THE INVENTION

The present invention provides a new and improved digital thermostat. More particularly, the present invention provides a new and improved digital thermostat having a display system that provides heating and cooling system operating information to the user in a non-intrusive and non-annoying manner. Even more particularly, the present invention provides a new and improved digital thermostat having a display system that provides heating and cooling system operating information to the user in an energy efficient and intuitive manner.

In one embodiment of the present invention, the display system for a digital thermostat provides animated icons on the user display of the digital thermostat. Such animated icons on the user display of the digital thermostat eliminates the need for the end user to modify the electronics of the digital thermostat by providing an intuitive interface to indicate activity of the heating and/or cooling equipment. In a preferred embodiment of the present invention, the animated icons are provided on a dot matrix liquid crystal display (LCD). Such animated icons on the LCD display do not utilize a significant amount of energy compared with the previous LED indicators, greatly enhancing the battery life of battery powered thermostats or thermostat interfaces.

In a preferred embodiment of the present invention, a bitmap image on the user display of the digital thermostat is overwritten with another bitmap image at a given frequency. This frequency can be changed programmatically, and is limited only by processor capabilities. In a highly preferred embodiment of the present invention, the frequency at which the bitmap images are overwritten is set at approximately 500 milliseconds. However, in one embodiment the frequency of overwriting is varied to provide a visual perception of various speeds of operation, e.g. to illustrate different fan speeds. Each bitmap has minor adjustments to the graphic such that the icon appears to the user as being animated to indicate operation of the heating and/or cooling equipment. At least two different bitmaps for each animated icon are used to provide the animation, and preferably more depending on the desired effect.

One embodiment of the present invention provides both LED and animated LCD indication of the operational status of the heating and/or cooling equipment. In such an embodiment, the thermostat preferably provides the user with the capability of disabling the LED indicators so as to not be annoying and/or distracting to the user.

In a preferred embodiment, the display system of the present invention provides animated icons for the user display of the digital thermostat for a heating mode of operation, a cooling mode of operation, and an indication of the operation of the blower fan. Preferably, the heating animated icon is displayed when the heating equipment is operating, the cooling animated icon is displayed when the cooling equipment is operating, and the fan icon is displayed when the fan is operating. In an alternate embodiment of the present invention, the fan icon is provided on the user display only when the fan is set to run continuously or intermittently, as opposed to running in conjunction with the heating and/or cooling equipment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 2-9 illustrate user display screens generated by and usable with the embodiment of the thermostat of the present invention illustrated in FIG. 1.

Figure 1:
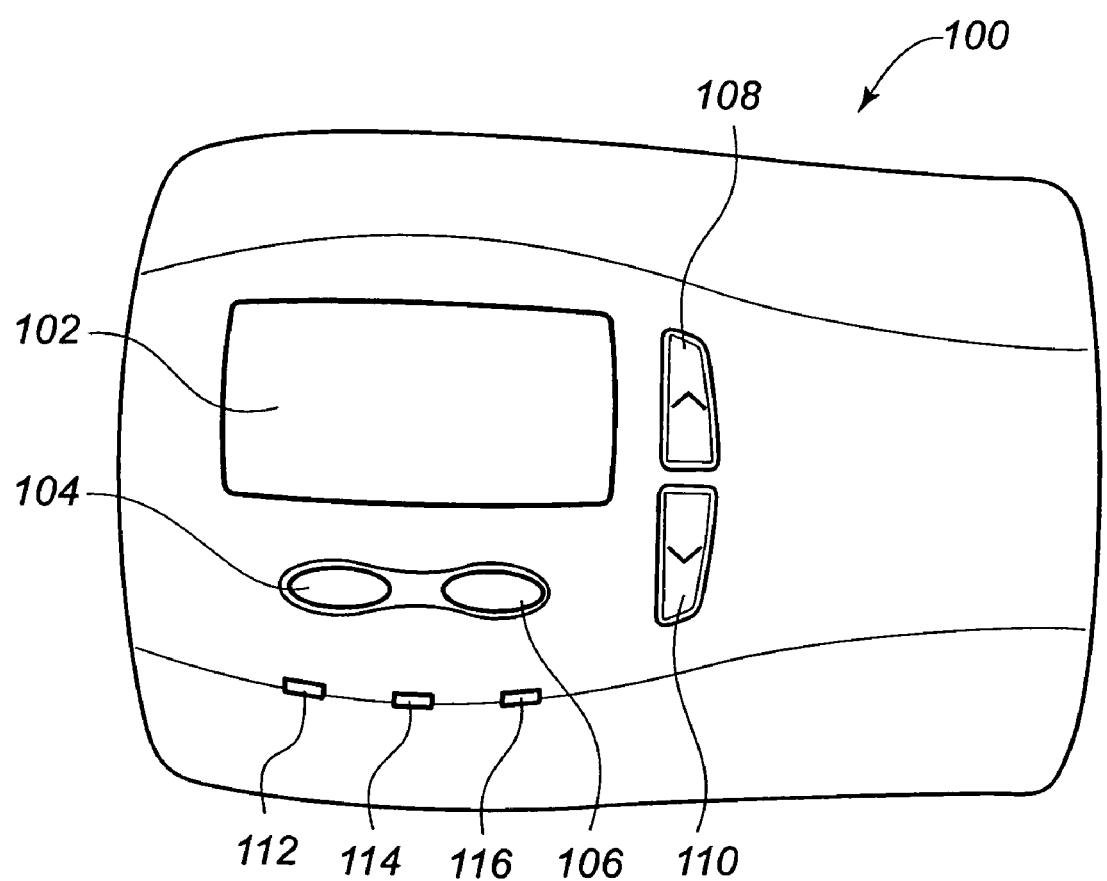
FIG. 1 is a top view illustration of an embodiment of a thermostat constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An embodiment of a thermostat constructed in accordance with the teachings of the present invention that incorporates the display system of the present invention is illustrated in FIG. 1. As with many thermostats, an internal temperature sensor that is monitored by the internal processor is included within the thermostat 100. As may be seen from this FIG. 1, this embodiment of the thermostat 100 includes a user display 102 on which is displayed programmatic, system, and ambient information regarding the operation of the HVAC system. This user display 102 may take various forms as are well-known in the art, and in a preferred embodiment is a dot matrix LCD display. With such a display 102, the consumer may activate various programmatic and control functions via a pair of soft keys 104, 106. The functionality executed by these soft keys 104, 106 varies dependent upon the programmatic state in which the thermostat 100 is at the time one of the soft keys 104, 106 is depressed. The particular functionality that will be instituted upon selection of one of the soft keys 104, 106 is displayed in an area of the user display 102 proximate the key 104, 106 which will institute that function. That is, the function that will be instituted upon selection of soft key 104 will be located generally in the lower left hand portion of user display 102 while the functionality that will be instituted by selection of soft key 106 will be located generally in the lower right hand portion of user display 102. These functional indicators may change depending on the program state and mode in which the thermostat is currently operating.

In addition to the soft keys 104, 106, this embodiment of the thermostat 100 of the present invention also includes adjustment keys 108, 110. These adjustment keys 108, 110 may serve to adjust a currently selected parameter up or down, such as in the case of setting the control temperature at which the thermostat will maintain the ambient environment. Additionally, these keys 108, 110 may scroll through the available data for a selected parameter, such as scrolling through alphanumeric data that may be selected for a given parameter. These keys 108, 110 may also function as soft keys depending on the programmatic state in which the thermostat is operating. When this functionality is provided, the function that will be instituted by selection of key 108 will be provided generally in the upper right hand corner of display 102, while the functionality that will be instituted by selection of key 110 will be displayed generally in the lower right hand corner of user display 102. In addition to the above, other use input means, such as an alphanumeric keypad, user rotatable knob, a touch screen, etc. may be utilized instead of the buttons 104-110 illustrated in the embodiment of FIG. 1.

In one embodiment, the thermostat 100 also includes operating mode visual indicators 112, 114, 116. These indicators 112-116 can be used provide a visual indication of the current operating mode of the thermostat if so desired by the user. If selected for usage be the consumer, indicator 112 will illuminate while the thermostat 100 is operating in the cooling mode. Indicator 116 will illuminate while the thermostat 100 is operating in the heating mode. Finally, indicator 114 will illuminate to indicate that the fan is operating. Depending on the particular application, this indicator 114 may illuminate whenever the fan is running, or may illuminate only when the fan is selected to run continuously. These indicators may also be turned off so as to not annoy the consumer and/or to conserve energy, particularly in embodiments of the present invention wherein the thermostat is battery powered. In each of these embodiments, the display system of the present invention provides alternate or exclusive indication of the operating mode and/or status of the heating and cooling system in an energy efficient and non-annoying manner, as will be discussed more fully below.

In embodiments of the present invention that do not utilize automated switching control between the heating and cooling modes of operation, these indicators 112-116 may operate as user selectable switches to allow the consumer to select the operating mode of the thermostat 100. For example, during the summer months the consumer may select the cooling mode by depressing indicator 112. In this mode, the furnace will not be turned on even if the interior ambient temperature drops below the set point. To switch from the cooling to the heating mode of operation, the consumer, in this alternate embodiment, would need to select indicator 116 to allow the thermostat 100 to operate the furnace. Consumer selection in this embodiment of indicator 114 would operate the fan continuously, as opposed to its normal automatic operation based upon a call for cooling or heat by the thermostat 100. In a still further embodiment of the present invention, the indicators 112-116 may also be utilized to provide a visual indication of system trouble, or that there is a system reminder message being displayed on user screen 102.

Having discussed the physical structure of one embodiment of a thermostat 100 constructed in accordance with the teachings of the present invention, the discussion will now focus on the display system which forms an aspect of the present invention. Indeed, while the following discussion will utilize the structure of the thermostat 100 illustrated in FIG. 1, those skilled in the art will recognize that various other structures can be utilized without departing from the spirit and scope of the present invention. That is, regardless of the user input mechanisms utilized by the particular embodiment of the thermostat 100 of the present invention, the programmatic steps and display information provided in the following discussion may be used.

FIG. 2 illustrates an exemplary idle screen 120 that may be displayed on the user interface 102 of the digital thermostat 100 illustrated in FIG. 1, or on other thermostat devices including battery powered remote thermostats and/or home control units. Such a screen 120 may be displayed, in a preferred embodiment, during normal operation of the digital thermostat. It should be noted, however, that the particular items and layout of the information illustrated in each of the screen shots discussed herein are provided by way of example only, and in no way limit the scope of the invention. Such particular screens are provided merely to illustrate the inventive features of the present invention in its various forms.

This idle screen 120 provides the user with information relating to the operation of the heating and cooling system, as well as programmatic and other information of interest to the consumer. Unique to the display system of the present invention, this idle screen 120 includes at least one animated icon that can un-intrusively convey to the user the operational status of various components of the heating and/or cooling system. The display of this animated icon may be in addition to or in place of an LED or other visual indicator, for example indicators 112-116 illustrated in the embodiment of thermostat 100 of FIG. 1. In such an embodiment, the thermostat may provide a user selectable option to turn off the LEDs 112-116 so as to not annoy the consumer.

An embodiment of the display system of the present invention may also include a static icon that may be used to convey the operating mode of the system to the consumer. As will be described more fully below, this static icon may become animated when the equipment corresponding to that mode of operation begins to operate. For example, the idle screen 120 illustrated in FIG. 2 includes the static icon of a flame 122 that simply conveys to the user the fact that the thermostat is set to the heating mode of operation. Obviously with the temperature set point set to 62° with a current interior temperature of 76.1° F. the heating equipment is not in operation. However, this static icon 122 conveys to the user that the thermostat is set in the heat mode of operation.

To provide icon animation, an embodiment to the present invention utilizes different bitmap representations of the icon that are displayed in sequence to provide the illusion to the consumer that the icon is animated. In the embodiment of the idle screen 120 illustrated in FIG. 2, the fan icon 124 is displayed to signify that the fan is operating. In one embodiment of the present invention, this fan icon 124 is displayed either because the fan is set to the on mode or to the intermittent mode of operation by the consumer. To provide the illusion that the fan is rotating, a first fan icon 124 is oriented in a first position. As illustrated in FIG. 3, a second fan icon 126 having a second orientation is used to provide the illusion of movement of the fan on the idle screen 120 from the first position to the second position. To provide the illusion of smooth movement of the fan, a third fan icon 128 illustrated in FIG. 4 may be utilized in one embodiment of the present invention on idle screen 120. When these three icons 124-128 are displayed in sequence, the fan appears to rotate to signify that the fan is running.

In a preferred embodiment of the present invention, the three fan icons 124-128 are cycled at a predetermined frequency to provide the illusion of movement of the fan. Preferably, this predetermined frequency changes the fan icon or re-writes at least the fan bitmap image approximately every 500 milliseconds. In one embodiment this frequency may be changed programmatically and is limited only by processor capabilities. A more rapid update of the image of the animated icon results in the illusion of the fan spinning faster, while a slower update provides the illusion of a slower moving fan. Indeed, in one embodiment of the present invention different update rates may be provided to give a visual indication to the consumer of different fan speeds, if such operation is provided by the thermostat.

To provide a visual indication to the consumer that the heating equipment is operating, the idle screen 120 illustrated in FIG. 5 includes a first bitmap image of an animated flame icon 130 on idle screen 120. The illusion of movement of the flame is provided by a second bitmap image of the animated flame icon 132 illustrated in FIG. 6. When these two images 130, 132 are displayed in sequence, the consumer is provided with a visual indication that the heating equipment is operating, as one would expect with a preset temperature of 77° F. and an interior temperature of 75.8° F. As discussed above, the images 130, 132 are replaced or re-written on the display 120 at a predetermined frequency, which may be changed programmatically. It should be noted that while the illustrated embodiment of the present invention only utilizes two different images for the flame icon 130, 132 to provide the user with the visual perception of a flickering flame, other embodiments of the present invention may use additional bitmaps images to provide additional animation as desired. However, unlike the rotating fan icons 124-128 discussed above, the movement of the flame 130, 132 does not necessarily require as many different bitmaps to provided the proper visual perception of a flickering flame.

While the illustrations of the flickering flame animated icon 130, 132 illustrated in FIGS. 5 and 6 do not also include the animated icons 124-128 illustrating operation of the fan, which normally will be operating when the heating equipment is operating, an alternate embodiment of the present invention may include both animated icons as desired. However, a preferred embodiment of the present invention does not include both animated icons as some consumers may find this confusing or distracting. That is, in one embodiment of the present invention the animated fan icon is used only when the fan mode is set to on or intermittent and the fan is operating without operation of the heating and/or cooling equipment. However, in such an embodiment both the rotating fan animated icons 124-128 and the flickering flame icons 130, 132 may be displayed if the fan mode is set to auto or intermittent and the heating equipment is also operating.

A situation where the fan is set to the on mode and the cooling equipment is currently operating, resulting in display of both the fan and cooling system animated icons, is illustrated in FIGS. 7-9. Specifically, FIGS. 7-9 illustrate the situation where the fan mode is set to on as illustrated by the animated fan icons 124-128, and the cooling equipment is currently operating as illustrated by the animated falling snowflakes 134, 138. As with the rotating fan animated icons 124-128, a smooth visual perception of falling snow indicating operation of the cooling equipment is provided by having three different animated icons 134, 136, 138 that are rewritten or replaced in sequence at a predetermined frequency. However, as with the other animated icons, additional or fewer images to form the animated icons may be provided, and the frequency that the images are rewritten or replaced may also be changed to provide a different visual presentation to the consumer without departing from the spirit and scope of the present invention.

The use of such animated icons on the user display of the thermostat greatly reduces the power consumption of the device and still providing the user with visual confirmation of the operation of the heating and/or cooling equipment controlled by the device. This is particularly useful in remote, battery powered thermostats or control units that are concerned with battery life. Such animated icons also provide a non-intrusive and un-annoying visual indication for thermostats mounted in areas of the home where the provision of an LED indication of the operational status of the heating and/or cooling equipment is not desired.

As will now be apparent from the foregoing to those of ordinary skill in the art, an embodiment of the method of providing a visual indication of the operational status of the present invention includes the step of providing an animated image signifying the operational status of heating and/or cooling equipment controlled by the thermostat. Preferably, the step of providing an animated image includes the steps of providing at least a first and a second image positioned slightly differently from one another, and displaying each of the first and second image in sequence to provide the illusion of movement of the image. Preferably, the images are rewritten or replaced at a predetermined frequency, which frequency may be programmatically changed. In a preferred embodiment the method includes the step of displaying at least a third image positioned slightly differently from the first and the second image to provide the illusion of smooth movement of the image. In an alternate embodiment, the frequency that the images are rewritten or replaced is changed to provide the illusion of movement of the image at a different speed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermostat for controlling heating and/or cooling equipment, comprising:
   a user display screen for displaying operational information about the heating and/or cooling equipment controlled by the thermostat; and
   wherein the thermostat displays at least one animated visual indication of operation of at least one of the heating and/or cooling equipment on the user display, the animated visual indication comprising a first icon positioned on the user display in a first orientation and a second icon positioned on the user display in a second orientation differing slightly from the first orientation, the thermostat alternatively displaying the first icon and the second icon.

2. The thermostat of claim 1, wherein the first icon is replaced with the second icon at a predetermined frequency.

3. The thermostat of claim 1, wherein the animated visual indication further comprises a third icon positioned on the user display in a third orientation differing slightly from the first and the second orientation, and wherein the thermostat alternatively displays the first icon, the second icon, and the third icon in sequence.

4. The thermostat of claim 3, wherein the first icon is replaced with the second icon, and the second icon is replaced by the third icon at a predetermined frequency.

5. The thermostat of claim 3, wherein a frequency at which the first icon is replaced with the second icon, and the second icon is replaced by the third icon is variable to provide a visual perception of different speeds of animation of the animated visual indication.

6. The thermostat of claim 3, wherein the animated visual indication comprises an indication of operation of the cooling equipment, and wherein the first, second and third icons are illustrations of snow flakes oriented such that sequencing of the first, second and third icons gives a visual perception of falling snow.

7. The thermostat of claim 3, wherein the animated visual indication comprises an indication of operation of a fan, and wherein the first, second and third icons are illustrations of a fan having a plurality of fan blades oriented such that sequencing of the first, second and third icons gives a visual perception of a rotating fan.

8. The thermostat of claim 1, wherein the animated visual indication comprises an indication of operation of the heating equipment, and wherein the first and second icons are illustrations of a flame oriented such that sequencing of the first and second icons gives a visual perception of a flickering flame.

9. The thermostat of claim 1, wherein the thermostat displays a static visual indication an operational mode of the thermostat.

10. The thermostat of claim 1, wherein the user display is a liquid crystal display (LCD), and wherein the first and second icons are bitmap images.

11. A thermostat for controlling heating and/or cooling equipment, comprising:
   a user display screen for displaying operational information about the heating and/or cooling equipment controlled by the thermostat;
   wherein the thermostat displays at least one animated visual indication of operation of at least one of the heating and/or cooling equipment on the user display, the animated visual indication comprising a first icon positioned on the user display in a first orientation and a second icon positioned on the user display in a second orientation differing slightly from the first orientation, the thermostat alternatively displaying the first icon and the second icon;
   wherein the first icon is replaced with the second icon at a predetermined frequency; and
   wherein the predetermined frequency is user programmable.

12. A method of providing a visual indication of an operational status of heating and/or cooling equipment controlled by a thermostat having a user display, comprising the step of displaying an animated image on the user display signifying the operational status of the heating and/or cooling equipment controlled by the thermostat when at least one of the heating and/or cooling equipment is operating.

13. The method of claim 12, wherein the step of displaying an animated image includes the steps of:
   displaying a first image having a first orientation on the user display; and
   replacing the first image with a second image having a second orientation slightly different than the first orientation.

14. The method of claim 13, further comprising the step of repeating the steps of displaying and replacing at a predetermined frequency.

15. The method of claim 14, further comprising the step of repeating the steps of displaying and replacing at a user programmable frequency.

16. The method of claim 12, wherein the step of displaying an animated image includes the steps of:
   displaying a first image having a first orientation on the user display;
   replacing the first image with a second image having a second orientation slightly different than the first orientation; and
   replacing the second image with a third image having a third orientation slightly different than the second orientation.

17. The method of claim 16, where the steps of displaying the first image, replacing the first image with the second image, and replacing the second image with the third image are repeated at a predetermined frequency to provide an illusion of smooth movement of the image.

18. The method of claim 17, further comprising the step of varying the predetermined frequency to provide an illusion of movement of the image at a different speed.

19. The method of claim 12, further comprising the step of displaying a static image on the user display signifying the operational mode of the thermostat.

20. The method of claim 12, further comprising the step of displaying a second animated image on the user display signifying the operational status of two of the heating and/or cooling equipment controlled by the thermostat when two of the heating and/or cooling equipment are operating.

* * * * *